US012762724B2

(12) United States Patent
Jia

(10) Patent No.: US 12,762,724 B2
(45) Date of Patent: Oct. 13, 2026

(54) OBJECT DIGITIZATION METHOD AND DEVICE, FACIAL SCANNING METHOD AND DEVICE, AND HANDHELD DIGITIZATION DEVICE

(71) Applicant: Guardian Glow Limited, HK (CN)

(72) Inventor: Zhang Jia, HK (CN)

(73) Assignee: Guardian Glow Limited, Hong Kong (CN)

( * ) Notice: Subject to any disclaimer, the term of this patent is extended or adjusted under 35 U.S.C. 154(b) by 0 days.

(21) Appl. No.: 19/194,040

(22) Filed: Apr. 30, 2025

(65) Prior Publication Data

US 2026/0073542 A1 Mar. 12, 2026

(30) Foreign Application Priority Data

Sep. 6, 2024 (CN) ......................... 202411248935.1

(51) Int. Cl.
*G06T 7/586* (2017.01)
*G06T 7/00* (2017.01)
(Continued)

(52) U.S. Cl.
CPC ............ *G06T 7/586* (2017.01); *G06T 7/0012* (2013.01); *G06T 7/521* (2017.01); *H04N 23/74* (2023.01);
(Continued)

(58) Field of Classification Search
CPC ..................... G06T 7/586; G06T 7/521; G06T 2207/10024; G06T 2207/10028;
(Continued)

(56) References Cited

U.S. PATENT DOCUMENTS 12,361,187 B1 * 7/2025 Khain ................ G01C 21/3841
12,474,210 B2 * 11/2025 Yetzbacher ........... G01J 3/0205
(Continued)

FOREIGN PATENT DOCUMENTS

CN 105324068 A 2/2016
CN 112130169 A 12/2020
(Continued)

*Primary Examiner* — Tsion B Owens
(74) *Attorney, Agent, or Firm* — IPRTOP LLC

(57) ABSTRACT

The present disclosure provides an object digitization method and device, a facial scanning method and device and a handheld digitization device, including: obtaining spectral images of a target object under multi-node illumination light sources; obtaining a response function of the spectral images; recovering reflection spectra of the target object based on the response function and a reflection database; obtaining a detailed point cloud of the target object and digitizing the target object based on the detailed point cloud and the recovered reflection spectra of the target object. The present disclosure can rapidly recover the true reflection spectra and high-resolution three-dimensional shape of the target object, thereby creating a realistic digital avatar, applicable to digital domains such as the metaverse. Based on this, the present disclosure can effectively acquire the reflection spectra and three-dimensional information of a face, enabling personal facial health monitoring and beauty applications.

33 Claims, 7 Drawing Sheets

(51) Int. Cl.
*G06T 7/521* (2017.01)
*H04N 23/74* (2023.01)

(52) U.S. Cl.
CPC ............... *G06T 2207/10024* (2013.01); *G06T 2207/10028* (2013.01); *G06T 2207/10152* (2013.01); *G06T 2207/30088* (2013.01); *G06T 2207/30201* (2013.01)

(58) Field of Classification Search
CPC . G06T 2207/10152; G06T 2207/30088; G06T 2207/30201; H04N 23/74
See application file for complete search history.

(56) References Cited

U.S. PATENT DOCUMENTS

| | | | | |
|---|---|---|---|---|
| 12,539,037 | B2 * | 2/2026 | Park | A61B 3/107 |
| 2023/0252637 | A1 * | 8/2023 | Xu | G06T 7/10 382/173 |

FOREIGN PATENT DOCUMENTS

| | | | |
|---|---|---|---|
| CN | 113609907 | A | 11/2021 |
| CN | 116977595 | A | 10/2023 |

* cited by examiner

OBJECT DIGITIZATION METHOD AND DEVICE, FACIAL SCANNING METHOD AND DEVICE, AND HANDHELD DIGITIZATION DEVICE

FIELD OF TECHNOLOGY

The present disclosure relates to the field of digitalization technology, and in particular, it relates to an object digitization method and device, a facial scanning method and device, and a handheld digitization device.

BACKGROUND

Information technology, propelled by advancements in computer science, has developed into a discipline focused on utilizing electronic information to represent and manage real-world entities. In recent years, the concept of digitization has emerged as an advanced evolution of traditional informatization. The key distinction between digitization and informatization lies in their respective scope and depth of application. While informatization primarily deals with the management of information, digitization extends this process to encompass comprehensive digital and data-driven representations of objects. In the context of datafication, every aspect of an object must undergo digitization—referred to as holographic digitization—enabling its manipulation and access through data-centric operations. In essence, object digitization involves the conversion of physical entities into digital formats, facilitating their integration and utilization across a wide range of digital applications.

SUMMARY

The present disclosure provides an object digitization method, an object digitization device, a facial scanning method, a facial scanning device, and a handheld digitization device, aiming to address technical challenges of achieving authentic and accurate object digitization.

In a first aspect, the present disclosure provides an object digitization method, including: obtaining spectral images of a target object under multi-node illumination light sources; obtaining a response function of the spectral images; recovering reflection spectra of the target object based on the response function and a reflection database; obtaining a detailed point cloud of the target object; and digitizing the target object based on the detailed point cloud and the recovered reflection spectra of the target object.

In one embodiment of the first aspect, the multi-node illumination light sources include multiple node light sources, and each of the node light sources is provided with a single-color-channel spectral light source or an N-color-channel spectral light source.

In one embodiment of the first aspect, each of the spectral light sources includes an LED light source and, arranged sequentially along a light transmission direction, an LED collimator, a microlens array, a projection lens, and a semi-transparent mirror. A light beam emitted by the LED light source sequentially passes through the LED collimator, the microlens array, the projection lens, and the semi-transparent mirror, and the light beam is then vertically incident on the target object.

In one embodiment of the first aspect, the LED light source is a circular light source including LEDs of four color channels, with those of the same color channel arranged symmetrically, respectively.

In one embodiment of the first aspect, obtaining the spectral images of the target object under the multi-node illumination light sources includes: controlling the N-color-channel spectral light sources to illuminate channel by channel to obtain N-color-channel multi-node spectral images of the target object.

In one embodiment of the first aspect, the response function of the spectral image is: RE [Nx1]=ALED [NxS*RefSpec [Sx1], where RE [Nx1] represents each pixel in the N-color-channel spectral images, ALED [NxS] represents emission spectra of the N-color-channel spectral light sources, N∈[3,15], RefSpec [Sx1] represents the reflection spectra of the target object, and S represents wavelengths corresponding to the N color channels, S∈[350, 800].

In one embodiment of the first aspect, the reflection database is obtained by: obtaining a plurality of sample objects, which have a same type as the target object; obtaining a plurality of sample reflection spectra of the plurality of sample objects based on the N-color-channel spectral light sources, N∈[3,15]; obtaining M representative reflection spectra based on the plurality of spectral clusters; using multiplication results of the M representative reflection spectra and the emission spectra of the N-color-channel spectral light sources as the reflection data of the reflection database.

In one embodiment of the first aspect, recovering the reflection spectra of the target object based on the response function with the reflection database includes: comparing each pixel in the N-color-channel spectral images with the reflection data to generate a weight matrix; recovering the reflection spectra of the target object based on the weight matrix.

In one embodiment of the first aspect, the weight matrix is obtained based on weighted least squares, and is given by:

$$W_i = \frac{R_i \cdot RE[N \times 1]}{|R_i| \cdot |RE[N \times 1]|}$$

where Ri represents a multiplication result of an i-th representative reflection spectrum and the emission spectra of the N-color-channel spectral light sources, i∈[1,M].

In one embodiment of the first aspect, recovering the reflection spectra of the target object based on the weight matrix includes:

the recovered reflection spectra of the target object is given by:

$$Spectest = \sum a_{test-p} \cdot RefSpec[S \times 1]$$

where $a_{test-p}$ is a p-th principal component of the target object and $$a_{test-p} = T \cdot RE[Nx1],$$

$$T = X[p \times M] \cdot W_i[M \times M] \cdot R^T[M \times N] \cdot inv\left[R_{N \times M} W_{iM \times M} R^T_{M \times N}\right] = [p \times N].$$

In one embodiment of the first aspect, obtaining the detailed point cloud of the target object includes: obtaining a rough point cloud of the target object; obtaining surface normals of the target object based on the multi-node illumination light sources; and obtaining the detailed point cloud based on the rough point cloud and the surface normal.

In one embodiment of the first aspect, obtaining the rough point cloud of the target object includes: obtaining multi-angle images of the target object; calculating a fundamental matrix based on feature matching among the multi-angle images; calculating a camera matrix based on the fundamental matrix; and obtaining the rough point cloud of the target object based on the camera matrix.

In one embodiment of the first aspect, obtaining the surface normals of the target object based on the multi-node illumination light source includes: obtaining a first luminance value and a second luminance value of the target object; and obtaining the surface normals based on a comparison result of the first luminance value with the second luminance value.

In one embodiment of the first aspect, the first luminance value is obtained as a brightness value of the target object illuminated by a first plurality of node light sources with a same light intensity.

In one embodiment of the first aspect, the second luminance value is a brightness value of the target object illuminated by a second plurality of node light sources with different light intensities. The light intensities of the node light sources are controlled by a light intensity function.

In one embodiment of the first aspect, the second plurality of the node light sources are distributed in a light cage configuration.

In one embodiment of the first aspect, the second plurality of the node light sources are linearly distributed along an X-direction or a Y-direction.

In one embodiment of the first aspect, the second luminance value is obtained as a brightness value of the target object illuminated by a third plurality of node light sources with different light intensities. The light intensities of the third plurality of node light sources are controlled by a light intensity function and a distance function.

In one embodiment of the first aspect, the third plurality of node light sources are arranged in a planar configuration.

In one embodiment of the first aspect, the light intensity function is:

$$L_i = k \cdot \text{theta } (i)$$

where $L_i$ is the light intensity of the i-th node light source, k is a constant, and theta (i) is an angle of the i-th node with respect to the target object.

In one embodiment of the first aspect, the distance function is:

$$L_i = d^2$$

where d is a distance between an i-th node light source and the target object.

In one embodiment of the first aspect, obtaining the detailed point cloud based on the rough point cloud and the surface normals includes: obtaining normals of the rough point cloud; correcting the rough point cloud based on the normals of the rough point cloud and the surface normals of the target object to obtain a corrected point cloud; and performing a correction operation iteratively until a comparison between the surface normals and the normals of the target object and the normals of the corrected point cloud satisfies a preset condition. The correction operation includes correcting the corrected point cloud based on the surface normals of the target object and the normals of the corrected point cloud to obtain a new corrected point cloud.

In one embodiment of the first aspect, obtaining the detailed point cloud based on the rough point cloud and the surface normals includes: obtaining normals of the rough point cloud; and optimizing the normals based on the bi Laplace equation. The surface normals are used as Neumann boundary conditions.

In a second aspect, the present disclosure provides an object digitization device. The device includes: an image acquisition module, configured to acquire spectral images of a target object under multi-node illumination light sources; a response module, configured to obtain a response function of the spectral images; a spectral restoration module, configured to restore a reflection spectrum of the target object based on the response function and a reflection database; a geometry restoration module, configured to acquire a detailed point cloud of the target object; a digitization module, configured to digitize the target object based on the detailed point cloud and restored reflection spectra of the target object.

In one embodiment of the second aspect, the device comprises an illumination module. The illumination module is configured to provide the multi-node illumination light sources; and the illumination module is configured to control the light intensity of the multi-node illumination light sources.

In one embodiment of the second aspect, the image acquisition module is further configured to acquire multi-angle images of the target object.

In a third aspect, the present disclosure provides a facial scanning method. The method performs a digital scanning of a face using the method for object digitization according to the first aspect, to obtain reflection spectra and a three-dimensional shape of the face; and evaluates facial cosmetic effects based on at least one of the following indicators derived from the reflection spectrum of the face: melanin concentration index, epidermal surface thickness index, blood volume index, and oxygen content index.

In one embodiment of the third aspect, the facial scanning method further includes: evaluating facial health based on the reflection spectra and the three-dimensional shape of the face.

In one embodiment of the third aspect, the facial scanning method further includes: evaluating the matching effect between the face and a cosmetic product based on the reflection spectra of the face and reflection spectra of the cosmetic product.

In a fourth aspect, the present disclosure provides a facial scanning device, and the device includes the object digitization device according to the second aspect.

In a fifth aspect, the present disclosure provides a handheld digitization device, and the device includes the object digitization device according to the second aspect. The image acquisition module is further configured to acquire spatial positions and orientations of the multi-node illumination light sources relative to the target object.

In one embodiment of the fifth aspect, the illumination module controls the light intensities of the multi-node illumination light sources based on the spatial positions and the orientations of the multi-node illumination light sources relative to the target object.

As described above, the object digitization method, the facial scanning method, the facial scanning device, and the handheld digitization device offer the following advantages:

1) The present disclosure provides a lighting source design composed of different spectral components and constructs a response function, enabling the rapid recovery of the true reflection spectra and high-resolution three-dimensional shape of the target object, which facilitates the creation of an authentic digital avatar, and can be applied in digital fields such as the metaverse.
2) The present disclosure effectively achieves facial digitization and, based on this, enables facial health monitoring and cosmetic analysis. The disclosed techniques identify the best cosmetic products with spectral matching under any lighting conditions, ensuring the health of the human face and delivering more effective outcomes for healthcare and beauty industries.
3) The present disclosure introduces a handheld digitization device capable of effectively digitizing physical objects in any scenario, significantly enhancing the convenience and efficiency of the digitization process.

DETAILED DESCRIPTION

Figure 1:
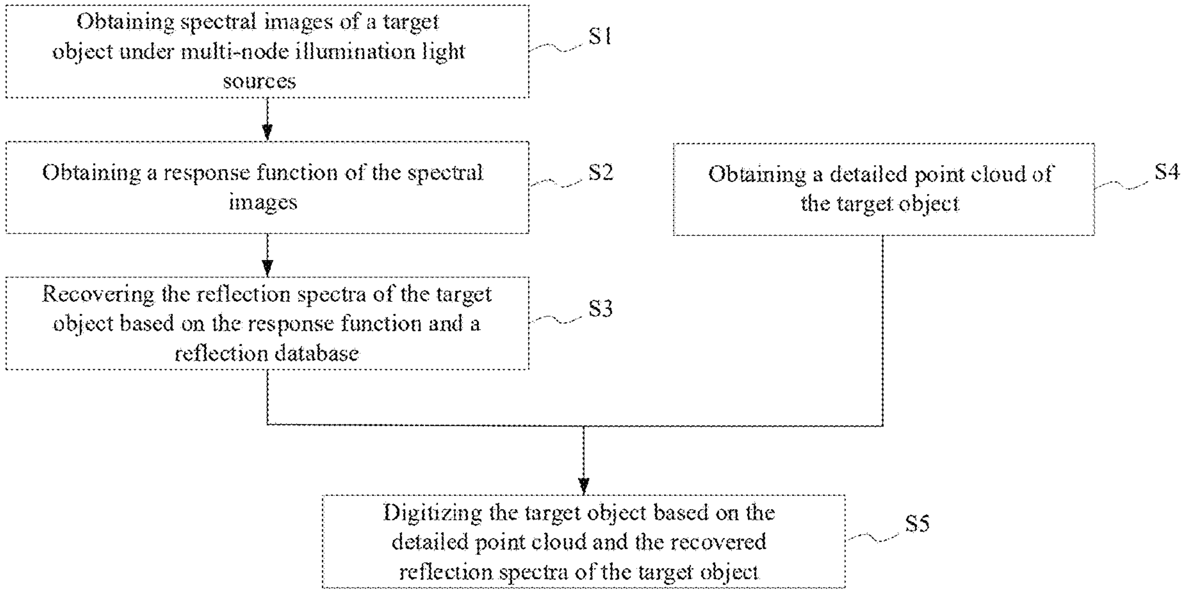
FIG. 1 shows a flowchart illustrating an object digitization method according to one embodiment of the present disclosure.

Embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and disclosures without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the layout of the components can also be more complicated.

In addition, the terms like "first" and "second" are used for descriptive purpose only, and are not to be construed as indicating or implying relative importance or implicitly specifying numbers of technical features indicated. Thus, features qualified with terms like "first" and "second" may explicitly or implicitly include at least one such feature. The technical solutions of various embodiments may be combined with each other; however, such combinations must be based on what can be implemented by a person skilled in the art. If the combination of technical solutions results in contradictions or becomes unimplementable, it shall be deemed that such combinations do not exist and are not within the scope of protection claimed in the present disclosure.

Object digitization refers to the conversion of physical objects from the real world into digital forms, which can then be applied in various digital applications. Currently, object digitization is often achieved by constructing a point cloud of the target object, creating a high-resolution three-dimensional representation, and applying the three-dimensional digital avatar in applications such as gaming and the web. Taking the metaverse as an example, it encompasses various aspects, including economy, politics, culture, and technology, representing an advanced version of a digital society.

In the context of metaverse technology, all entities and activities in the real world exist and operate within the digital space. Nothing is purely virtual, and nothing is purely real—virtual and reality are fully integrated. It can be said that the metaverse extends human existence from the real world to the digital world, representing a new form of human existence. However, during the digitization process, there is often a lack of focus on the spectral characteristics of physical objects, leading to a certain degree of distortion in the spectral representation of digital objects, making it difficult to achieve a complete match with the real-world, which affects the application of many digital scenarios. Furthermore, in the fields of healthcare and medical aesthetics, object digitization methods are also applied to digitize human facial features for better analysis of skin composition indicators or to evaluate the effectiveness of aesthetic treatments. However, due to spectral distortion of the skin, the assessment results for medical or cosmetic procedures are affected, making it challenging to effectively ensure the health of the skin.

To at least address the above-mentioned technical problems, embodiments of the present disclosure provide an object digitization method and device, a facial scanning method and device, and a handheld digitization device, aimed at solving the technical problem of how to authentically achieve object digitization.

Referring to FIG. 1, the object digitization method of the present disclosure includes S1-S5.

S1: obtaining spectral images of a target object under multi-node illumination light sources.

To recover the authentic reflection spectra of the target object under different spectral illuminations, thereby ensuring the authenticity of the digitized object, the multi-node illumination light sources of the present disclosure include a plurality of node light sources to illuminate the target object. Each of the node light sources is provided with a single-color-channel spectral light source or an N-color-channel spectral light source, N∈[3,15].

Furthermore, the node light sources within a frontal range of the target object are respectively provided with N-color-channel spectral light sources, N∈[3,15].

It should be noted that the multi-node illumination light sources actually provide illumination of N color channels. Some of the node light sources (outside a frontal range of the target object) only provide a single-color channel among the N color channels.

Figure 2:
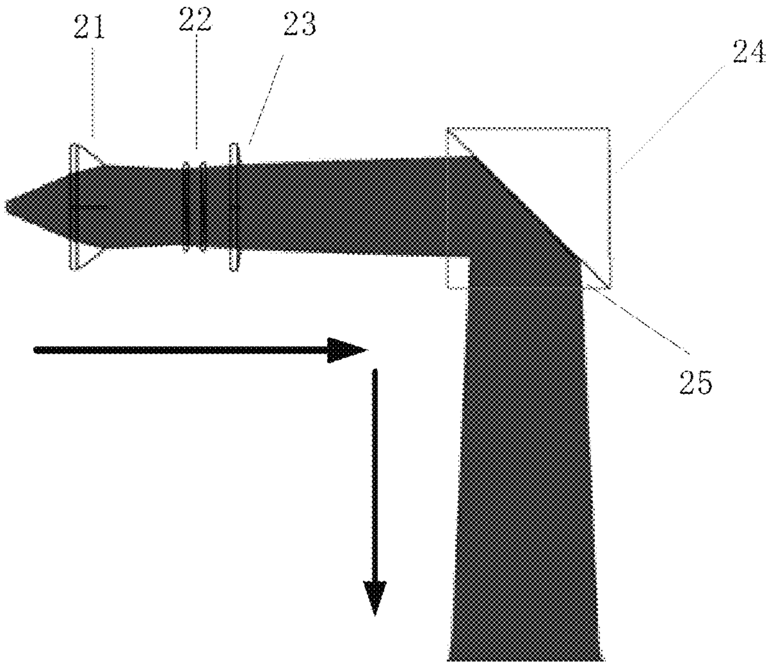
FIG. 2 shows a schematic structural diagram of spectral light sources according to one embodiment of the present disclosure.

In some embodiments, referring to FIG. 2, each spectral light source includes an LED light source 21 and, arranged sequentially along a light transmission direction, an LED collimator 22, a microlens array 23, a projection lens 24, and a semi-transparent mirror 25. A light beam emitted by the LED light source 21 sequentially passes through the LED collimator 22, the microlens array 23, the projection lens 24, and the semi-transparent mirror 25, and then is vertically incident on the target object.

Figure 3:
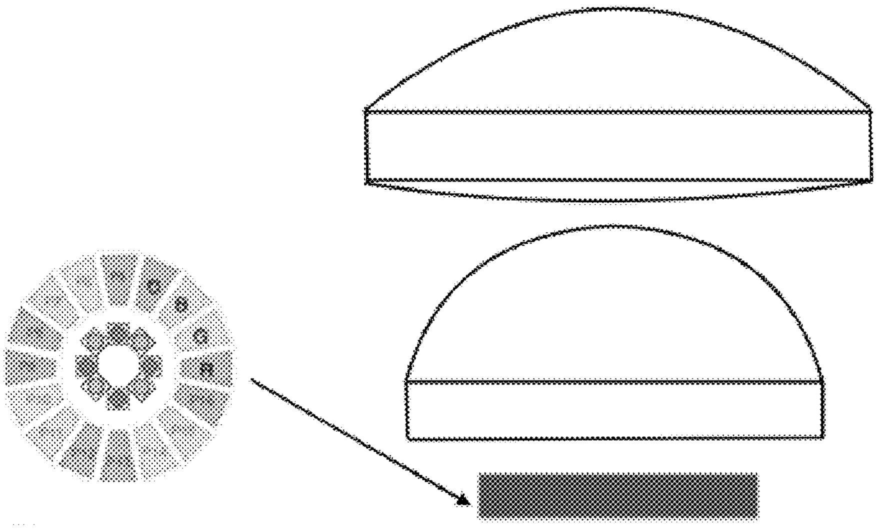
FIG. 3 shows a schematic structural diagram of an LED light source according to one embodiment of the present disclosure.

Furthermore, referring to FIG. 3, as an example, the LED light source is a circular light source including multiple LEDs of different colors. Each color channel has four LEDS arranged symmetrically, in order to provide better spatial uniformity. Thus, the spectral light sources designed in the present disclosure can ensure that any illuminated point in the illuminated area receives uniform light: spatially uniform illuminance and spectral components. For example, Point A and Point B may be two areas in the illuminated area, and Point A and Point B have the same irradiance for any color channel as provided by spectral light sources.

It should be noted that, if a spectral light source with N color channels is provided on each node, LEDs of the N colors can be integrated into the same LED light source 21. That is, in the same LED light source, four LEDs of each color are arranged symmetrically, and LEDs of different colors collectively form a symmetrically arranged circular light source. Taking FIG. 3 as an example, it shows the LED light source 21 with four colors integrated into one, where each of the four colors has four identical LEDs arranged symmetrically. At this time, the LED light source 21 on one node can be controlled to emit light of four colors, which passes through the same LED collimator 22, the microlens array 23, the projection lens 24, and the semi-transparent mirror 25.

Figure 4:
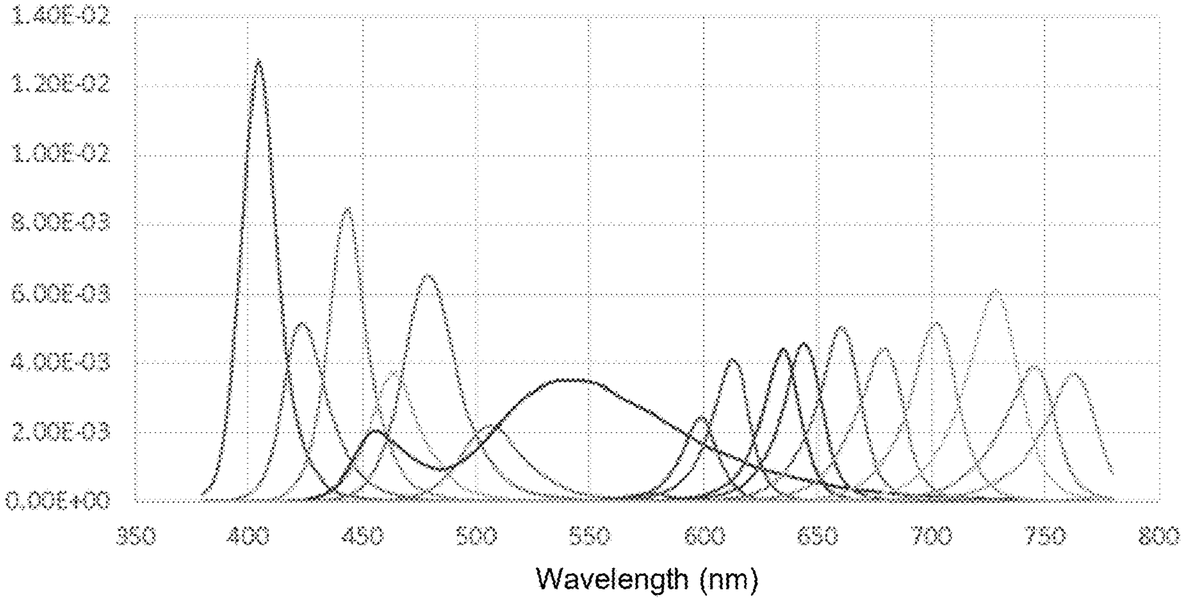
FIG. 4 shows a schematic diagram of wavelength ranges covered by the spectral light sources for each color channel according to one embodiment of the present disclosure.

Furthermore, referring to FIG. 4, each color channel of a spectral light source covers a specific wavelength range (having a peak wavelength and a spectral width). When providing the multi-node illumination light sources, specific color channels to be used can be selected based on different needs regarding the target object, thereby performing spectral recovery of the surface of the target object.

In addition, in some embodiments, a white spectral light source with a certain spectral shape can be selectively used. Unlike spectral light sources of other color, a white spectral light source can provide a full visible light range (400-700 nanometers) or even broader, thus enabling better spectral recovery of the target object in certain scenarios.

Figure 5:
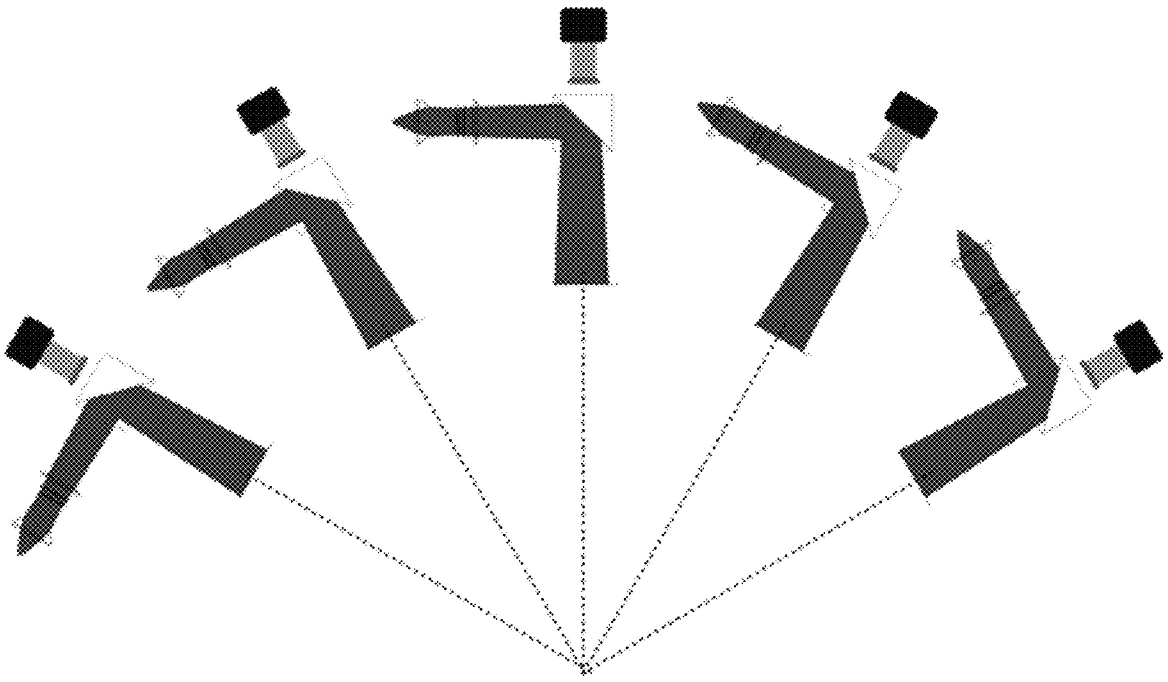
FIG. 5 shows a schematic diagram of lighting arrangement for multi-node illumination light sources according to one embodiment of the present disclosure.

Taking FIG. 5 as an example, the multi-node illumination light sources provided by the above embodiments illuminate a target object, during which time spectral light sources of the same color channel on different nodes are controlled to illuminate channel by channel, to obtain N-color-channel multi-node spectral images of the target object. Referring to FIG. 5, in some embodiments, a camera can be provided after each of the node light sources to obtain spectral images corresponding to the node position (that is, acquiring multi-node spectral images of the target object under illumination of spectral light sources of different color channels). In some embodiments, a single movable camera can used to obtain spectral images at multiple node positions. Therefore, for each node (corresponding to an illumination position of the target object), multiple spectral images of the target object (at different shooting positions) can be acquired under illumination of spectral light sources of different color channels. Of course, a camera can also be positioned at the front of the target object to obtain only spectral images within a frontal range.

In addition, each camera can include either a monochrome lens or a color lens.

S2: obtaining a response function of the spectral images.

For the spectral images, each pixel contains complete spectral information. Therefore, by recovering the spectral information of each pixel in the spectral images of the target object, the complete spectrum of corresponding regions of the target object in the spectral images can be obtained. To this end, for each pixel in the N-color-channel spectral images, the following response function is obtained as:

$$RE\ [N\times 1] = ALED\ [N\times S]^{*}RefSpec\ [S\times 1]$$

where RE [Nx1] represents each pixel in the N-color-channel spectral images, ALED [NxS] represents emission spectra of the N-color-channel spectral images, N∈[3,15], RefSpec [Sx1] represents the reflection spectra of the target object, and S represents wavelengths corresponding to the N color channels, S∈[350, 800].

As described above, each color channel covers a specific wavelength range (having a peak wavelength and spectral width). Therefore, in the above formula, for each value of N, there is a corresponding range of values for S.

S3: recovering the reflection spectra of the target object based on the response function and a reflection database.

After obtaining the response function of the spectral images, by comparing the response function with a reflection database, each pixel in the spectral images can be recovered based on the reflection database, thereby obtaining true and unbiased reflection spectra. Thus, the reflection database is essentially a database of reflection spectra for objects of the same type as the target object. Taking the target object being an East Asian face as an example, spectral shapes of East Asian faces exhibit similarity, meaning that spectral variations of East Asian faces follow certain patterns. Therefore, after establishing a reflection spectrum database for East Asian faces, acquired reflection spectra of the target object can be compared with the database to achieve precise recovery of the target spectrum.

Figure 6:
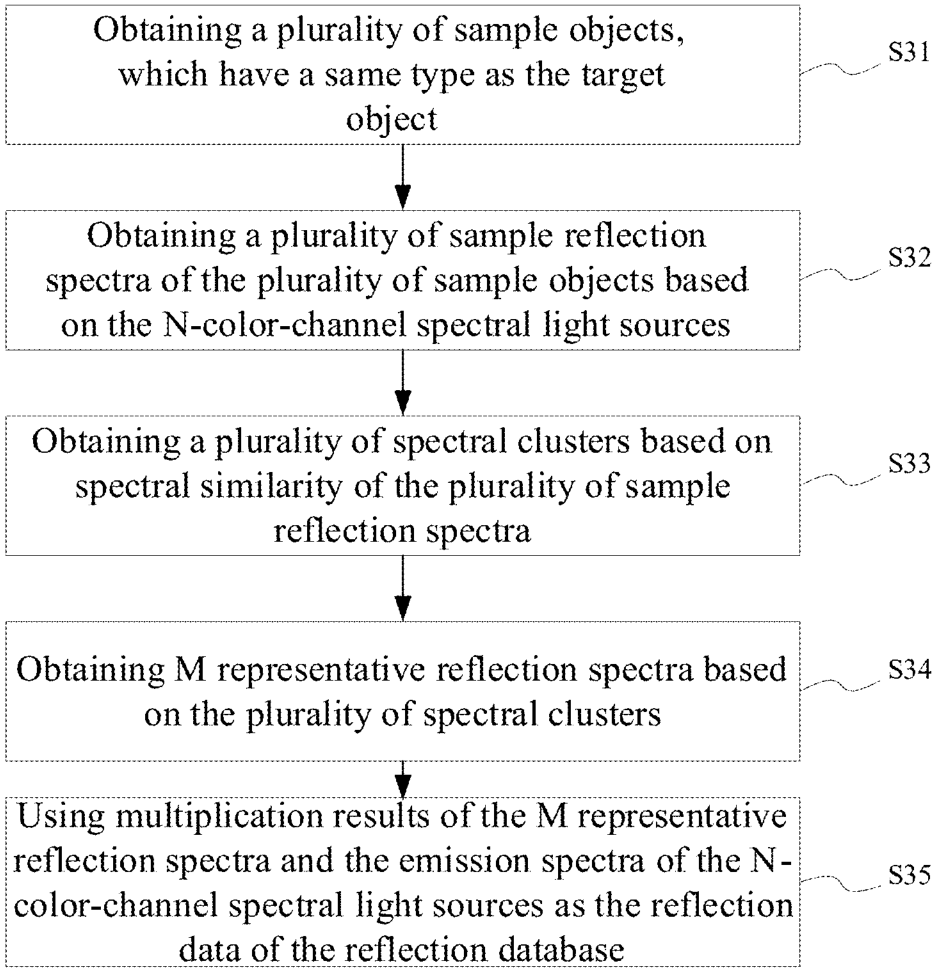
FIG. 6 shows a flowchart illustrating an object digitization method according to one embodiment of the present disclosure.

Referring to FIG. 6, the method for obtaining the reflection database includes S31-S35.

S31: obtaining a plurality of sample objects of the same type as the target object.

Specifically, taking faces of individuals of Asian descent as an example, multiple Asian faces are used as sample objects.

S32: obtaining a plurality of sample reflection spectra of the plurality of sample objects based on the N-color-channel spectral light sources.

Specifically, by illuminating the plurality of sample objects with multi-node illumination light sources of a constant same design, a plurality of sample reflection spectra corresponding to the plurality of sample objects are obtained. That is, when digitizing East Asian faces, a reflection database for East Asian faces needs to be established in advance. At this time, a constant design of the multi-node illumination light sources should be adopted, including ensuring consistency in the color channels of the spectral light sources across the plurality of node light sources.

S33: obtaining a plurality of spectral clusters based on spectral similarity of the plurality of sample reflection spectra.

S34: obtaining M representative reflection spectra based on the plurality of spectral clusters.

In some embodiments, a total of 3500 sample reflection spectra are obtained. Due to the similarity among the reflection spectra of the plurality of sample objects, these 3500 spectra can be clustered using the principal component analysis (PCA) method or the K-means method, thereby obtaining 6 spectral clustering clusters. Subsequently, within each spectral clustering cluster, 50 sample emission spectra are selected, and these 50 sample emission spectra should be uniformly distributed within the cluster. Thus, for the 6 spectral clustering clusters, a total of M=300 representative reflection spectra can be obtained, and these representative reflection spectra can represent all of the sample reflection spectra.

S35: using multiplication results of the M representative reflection spectra and the emission spectra of the N-color-channel spectral light sources as the reflection data of the reflection database.

Taking M=300 as an example, using multiplication results of the 300 representative reflection spectra and the emission spectra of the N-color-channel spectral light sources as the reflection data of the reflection database. Therefore, by selecting M representative reflection spectra through clustering, the computational load of the data can be significantly reduced, the efficiency of spectral recovery can be improved, and it can be ensured that the M representative reflection spectra represent the true spectral information of the sample objects, facilitating the precise recovery of the target spectrum of the target object.

According to the response function of the pixels described above, it is evident that the reflection data should, in fact, represent the true spectral information of each pixel of the sample objects. Thus, by comparing each pixel (response function) in the N-color-channel spectral images with the reflection data, a weight matrix can be generated, and the reflection spectra of the target object can be recovered using the weight matrix.

Specifically, the weight matrix is obtained based on the weighted least squares method as follows:

$$W_i = \frac{R_i \cdot RE[N \times 1]}{|R_i| \cdot |RE[N \times 1]|}$$

where Ri represents a multiplication result of an i-th representative reflection spectrum and the emission spectra of the N-color-channel spectral light sources, i∈[1,M].

Specifically, the reflection spectra of the target object is recover based on the weight matrix, and the recovered reflection spectrum of the target object is given by:

$$Spectest = \sum a_{test-p} \cdot RefSpec[S \times 1]$$

where $a_{test-p}$ is a p-th principal component of the target object and $$a_{test-p} = T \cdot RE[Nx1],$$

$$T = X[p \times M] \cdot W_i[M \times M] \cdot R^T[M \times N] \cdot inv\left[R_{N\times M} W_{iM\times M} R^T_{M\times N}\right] = [p \times N].$$

Since spectral information of the target object can be considered a linear combination of the principal components of the target object, that is, the p principal components of the target object effectively contain the spectral information of the target object. Therefore, by recovering each principal component, the fully recovered reflection spectra of the target object can ultimately be obtained. Herein, the number of principal components (the value range of p) should be determined through PCA, meaning that for different types of target objects, the value of p will vary. The specific number of principal components can be determined during the acquisition of representative reflection spectra, based on the spectral analysis of the plurality of sample objects.

S4: obtaining a detailed point cloud of the target object.

Figure 7:
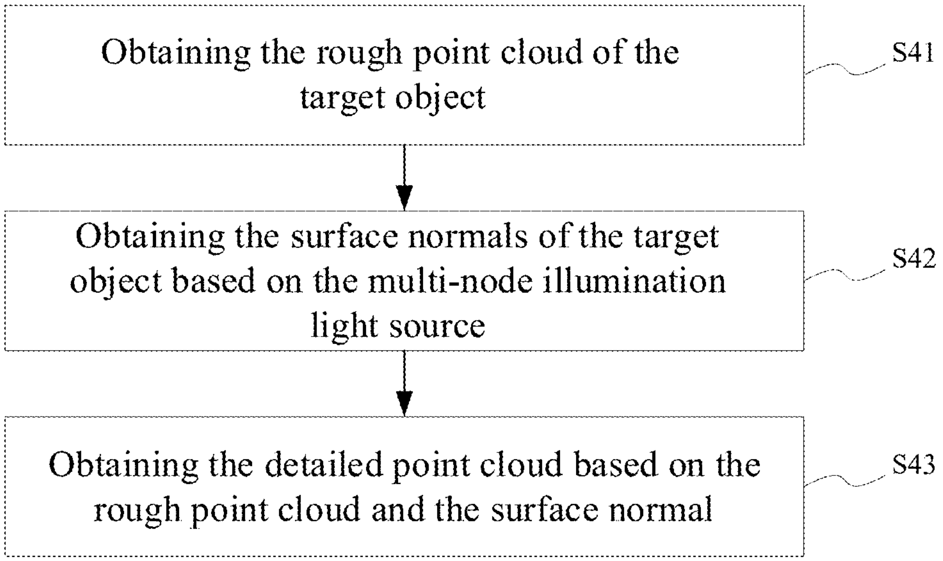
FIG. 7 shows a flowchart illustrating an object digitization method according to one embodiment of the present disclosure.

Specifically, referring to FIG. 7, obtaining the detailed point cloud of the target object includes S41-S43.

S41: obtaining the rough point cloud of the target object.

In some embodiments, S41 includes:

1) acquiring multi-angle images of the target object;
2) calculating the fundamental matrix based on feature matching between the multi-angle images;
3) calculating the camera matrix based on the fundamental matrix;
4) obtaining the rough point cloud of the target object based on the camera matrix.

Specifically, images of the target object are acquired from multiple angles, that is, multi-angle images are obtained. Subsequently, the images from multiple angles are processed. First, two initial images can be selected, and feature point detection for these two images can be performed using SIFT, SURF, or ORB to identify corresponding matching points. Subsequently, the RANSAC method is used to estimate the optimal fundamental matrix and the indices of correct points. The fundamental matrices for different image pairs are computed, and the camera matrix (rotation matrix and translation vector) is derived from the fundamental matrix. Finally, triangulation is used to compute three-dimensional points. Based on this, new images are incrementally added. Feature points are extracted from the new images and matched with previous images to obtain new matching relationships. The camera pose of the new image relative to the previous images is estimated, typically using Perspective-n-Point (PnP) under a known camera matrix. The three-dimensional points from this angle and their corresponding image point coordinates are used to estimate the shooting information for that angle. New matching pairs and the estimated pose (rotation matrix and translation vector) are then used for triangulation to generate new three-dimensional points. These newly generated three-dimensional points are merged with the previous point cloud, thereby constructing a larger sparse point cloud. By incrementally adding images from all angles in this manner, the rough point cloud is ultimately obtained.

In the above embodiments, the steps can be implemented using OpenCV.

In some embodiments, alternative methods can also be selected to obtain the rough point cloud of the target object, such as Time of Flight (TOF) principle.

It should be noted that when obtaining multi-angle images, colors and intensity of the illumination are not restricted as long as multiple images are obtained from different angles.

S42: obtaining the surface normals of the target object based on the multi-node illumination light source.

Specifically, obtaining the surface normals of the target object based on the multi-node illumination light sources includes: obtaining a first luminance value and a second luminance value of the target object, and obtaining the surface normals based on a comparison result of the first luminance value with the second luminance value.

In some embodiments, the first luminance value is a brightness value of the target object illuminated by a first plurality of node light sources with a same light intensity.

In some embodiments, the second luminance value is a brightness value of the target object illuminated by a second plurality of node light sources with different light intensities. The light intensities of the node light sources are controlled by a light intensity function.

Specifically, the light intensity function is:

$$L_i = k \cdot \text{theta } (i)$$

where $L_i$ is the light intensity of an i-th node light source, k is a constant, and theta (i) is an angle of the i-th node light source with respect to the target object.

In the above embodiments, the second plurality of the node light sources are linearly distributed along X-direction or Y-direction. When the second plurality of the node light sources are distributed in a light cage configuration or linear configuration, the light sources can uniformly illuminate the target object from various directions, ensuring that the target object receives uniform light from all angles.

Figure 8:
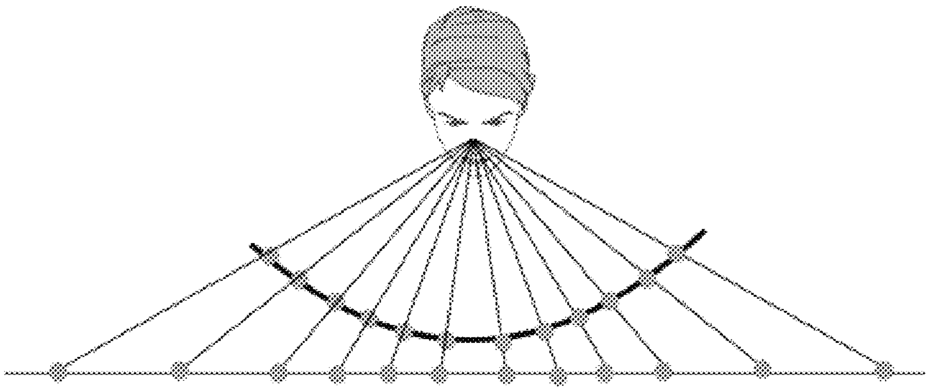
FIG. 8 shows a schematic distribution pattern of several node light sources according to one embodiment of the present disclosure.

FIG. 8 shows the second plurality of the node light sources distributed in a light cage configuration or in an X-direction linear configuration. Referring to FIG. 8, taking the X-direction as an example, the second plurality of the node light sources are set to the same intensity, and the luminance of the target object (shown as a face in FIG. 8) at this time is recorded as the first luminance value. Subsequently, the light intensities of the second plurality of the node light sources are adjusted according to the aforementioned light intensity function, thereby achieving a gradual increase or decrease in illumination from left to right (gradient lighting), and the luminance of the target object (shown as a face in FIG. 8) at this time is recorded as the second luminance value. Finally, the first luminance value and the second luminance value are compared to obtain the surface normal.

In some other embodiments, the second luminance value is obtained as a brightness value of the target object illuminated by a third plurality of node light sources with different light intensities. The light intensities of the third plurality of node light sources are controlled by a light intensity function and a distance function. Specifically, the distance function is given by:

$$L_i = d^2$$

where d is a distance between an i-th node light source and the target object.

In the above embodiments, the third plurality of node light sources are arranged in a planar configuration. The light sources can also uniformly illuminate the target object from various directions, ensuring that the target object receives uniform light from all angles.

Specifically, when the third plurality of node light sources are arranged in a planar configuration, all node light sources are still set to the same intensity, and the luminance of the target object (shown as a face in FIG. 8) at this time is recorded as the first luminance value. Subsequently, when designing gradient lighting, the light intensities of the third plurality of node light sources need to be adjusted according to direction and distance. That is, the light intensities of the third plurality of node light sources are adjusted based on the aforementioned light intensity function and distance function, thereby achieving a gradual increase or decrease in illumination from left to right. At this time, the light intensities of the third plurality of node light sources are actually consistent with those when distributed in the light cage configuration. Finally, obtaining the surface normals based on a comparison result of the first luminance value with the second luminance value.

S43: obtaining the detailed point cloud based on the rough point cloud and the surface normal.

Specifically, S43 includes S431-S433.

S431: obtaining normals of the rough point cloud.

S432: correcting the rough point cloud based on the normals of the rough point cloud and the surface normals of the target object to obtain a corrected point cloud.

S433: performing a correction operation iteratively until a comparison between the surface normals of the target object and the normals of the corrected point cloud satisfies a preset condition. The correction operation comprises correcting the corrected point cloud based on the surface normals of the target object and the normals of the corrected point cloud to obtain a new corrected point cloud.

In the above embodiments, after obtaining the rough point cloud of the target object in step S41, further optimization is required to obtain a detailed point cloud, thereby creating a realistic digital object. Therefore, using the rough point cloud obtained in step S41 as a foundation, the normals of the rough point cloud are acquired. Then, the high-frequency components of the surface normals obtained in step S42 are added to the normals of the rough point cloud, and combined with the rough point cloud to calculate a more detailed point cloud, namely a corrected point cloud. Subsequently, the normals of the corrected point cloud are obtained, and the surface normals are compared with the normals of the corrected point cloud to determine whether a preset threshold condition is satisfied. If the condition is not satisfied, the same process as described above is repeated: the high-frequency components of the surface normals are added to the normals of the corrected point cloud, and combined with the corrected point cloud to calculate an even more detailed point cloud, namely a new corrected point cloud. Said iterative process continues until a final detailed point cloud is obtained.

In other embodiments, the normals of the rough point cloud may also be obtained and optimized based on the bi-Laplace equation to obtain a detailed point cloud. Where the surface normals are used as Neumann boundary conditions.

In the above embodiments, the PCA method can be utilized to obtain the normals of the rough point cloud or the corrected point cloud. First, a covariance matrix of the rough point cloud or the corrected point cloud is calculated, and the eigenvectors and eigenvalues of the covariance matrix are computed. Then, the eigenvector corresponding to the smallest eigenvalue is selected as the estimated normal direction.

In other embodiments, alternative methods can also be chosen to obtain the normals of the rough point cloud or the corrected point cloud, such as surface reconstruction.

S5: digitizing the target object based on the detailed point cloud and the recovered reflection spectra of the target object.

Specifically, after obtaining the detailed point cloud and the recovered reflection spectrum of the target object, digitization of any target object can be performed based on both, and the result can be replicated in a 3D or 2D graphical viewing portal (such as a computer, a monitor, or a XR headset).

Since the method integrates the 3D information and spectral information of the target object, the digital object digitized using the object digitization method provided in this application exhibits the highest accuracy. It can be widely applied in digital fields such as the metaverse, VR/AR, and can also be used to detect human skin and assess its health status.

The present disclosure further provides a facial scanning method, where the method performs a digital scanning of a face using the method for object digitization according to the above embodiments, to obtain reflection spectra and a three-dimensional shape of the face.

In some embodiments, facial cosmetic effects are evaluated based on at least one of indicators derived from the reflection spectra of the face, where the indicators include: melanin concentration index, epidermal surface thickness index, blood volume index, and oxygen content index.

Specifically, after a beauty treatment is performed on the face, the effectiveness of the treatment requires precise measurement of the details of the facial shape, which can be achieved by accurately capturing the changes in the three-dimensional shape information. Additionally, based on the reflection spectrum, the melanin concentration index, epidermal surface thickness index, blood volume index, and oxygen content index can be obtained. Thus, by analyzing the changes in the 3D information and spectral information before and after the beauty treatment, the effectiveness of the treatment can be assessed.

Figure 9A:
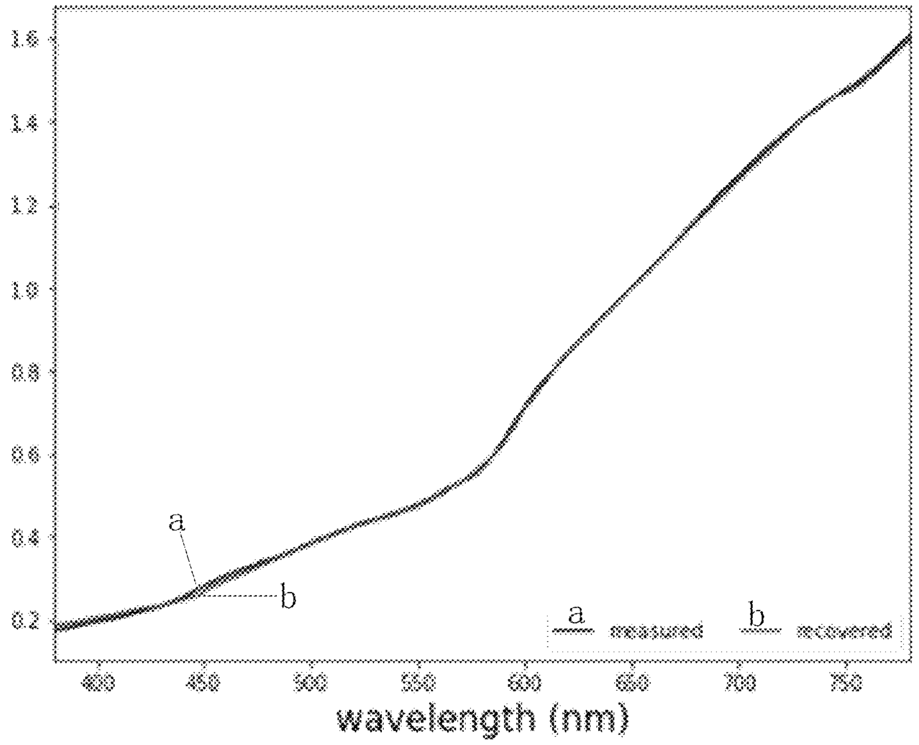
FIGS. 9*a*-9*b* are schematic diagrams showing differences between true spectral curves and measured spectral curves obtained from scanning facial skin using a facial scanning method according to embodiments of the present disclosure.
Figure 9B:
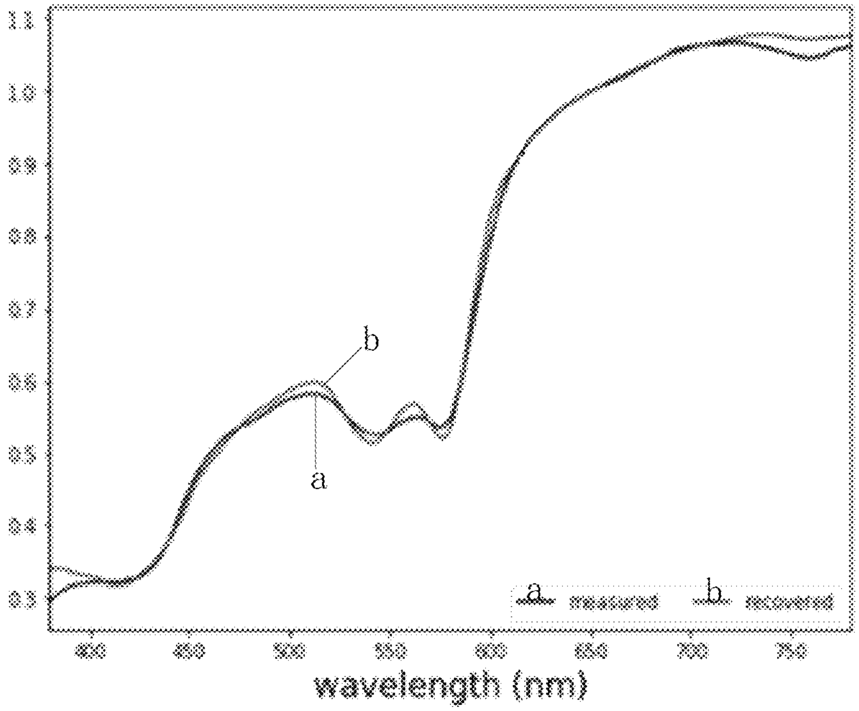

FIGS. 9*a*-9*b* illustrate applications of the facial scanning method provided in the present disclosure to scan facial skin, obtaining schematic diagrams of the differences between true spectral curves and measured spectral curves. As shown in FIG. 9*a*, the difference between the true spectral curve and the measured spectral curve is minimal. The melanin concentration index obtained based on the true reflection spectrum in FIG. 9*a* is 38.83%, the blood volume index is 4.19%, the epidermal surface thickness index is 42.51 μm, and the oxygen content index is 10.25%. As shown in FIG. 9*b*, the difference between the true spectral curve and the measured spectral curve is significant. The melanin concentration index obtained based on the true reflection spectrum in FIG. 9*b* is 6.33%, the blood volume index is 7.75%, the epidermal surface thickness index is 46.35 μm, and the oxygen content index is 85.66%. This also indicates that for individuals of Caucasian descent and the elderly, the facial scanning method described in the present disclosure can better capture the true spectral curves of the skin, as well as obtain the true values of the melanin concentration index, epidermal surface thickness index, blood volume index, and oxygen content index, thereby enabling a more accurate evaluation of facial beauty treatments.

In some embodiments, after obtaining the reflection spectrum and three-dimensional shape of the face, an evaluation of facial health can be conducted based on the information.

Taking dark circles and complexion as examples, by scanning the face to obtain the reflection spectral information of the skin, the causes of dark circles can be identified. Furthermore, after acquiring the three-dimensional information (precise microstructure), timely evaluations of facial health can be made based on daily changes, helping to prevent the occurrence of diseases such as skin cancer.

As mentioned above, at least for individuals of Caucasian descent and the elderly, the facial scanning method described in the present disclosure can better capture the true spectral curves of the skin, thereby enabling timely monitoring of facial health and helping to prevent diseases such as skin cancer.

In some embodiments, after obtaining the reflection spectrum of the face, the reflection spectrum of cosmetics can also be acquired, allowing for an evaluation of the matching effect between the cosmetics and the face based on this information.

Specifically, after scanning the face to obtain reflection spectrum of the face, the cosmetics can also be scanned using the object digitization method provided in the above embodiments to obtain the reflection spectrum of the cosmetics. In this way, it can be achieved that under any light source, the higher the similarity between the reflection spectrum of the face and that of the cosmetics, the greater the degree of matching between the cosmetics and the face.

The scope of the method for the object digitization method and the facial scanning method as described in the present disclosure is not limited to the sequence of operations listed. Any scheme realized by adding or subtracting operations or replacing operations of the traditional techniques according to the principle of the present disclosure is included in the scope of the present disclosure.

The present disclosure also provides an object digitization device and a facial scanning device, the object digitization device can implement the object digitization method described in the present disclosure, but the device for implementing the object digitization method described in the present disclosure includes, but is not limited to, the object digitization device as described in the present disclosure. Any structural adjustment or replacement of the prior art made according to the principles of the present disclosure is included in the scope of the present disclosure.

Figure 10:
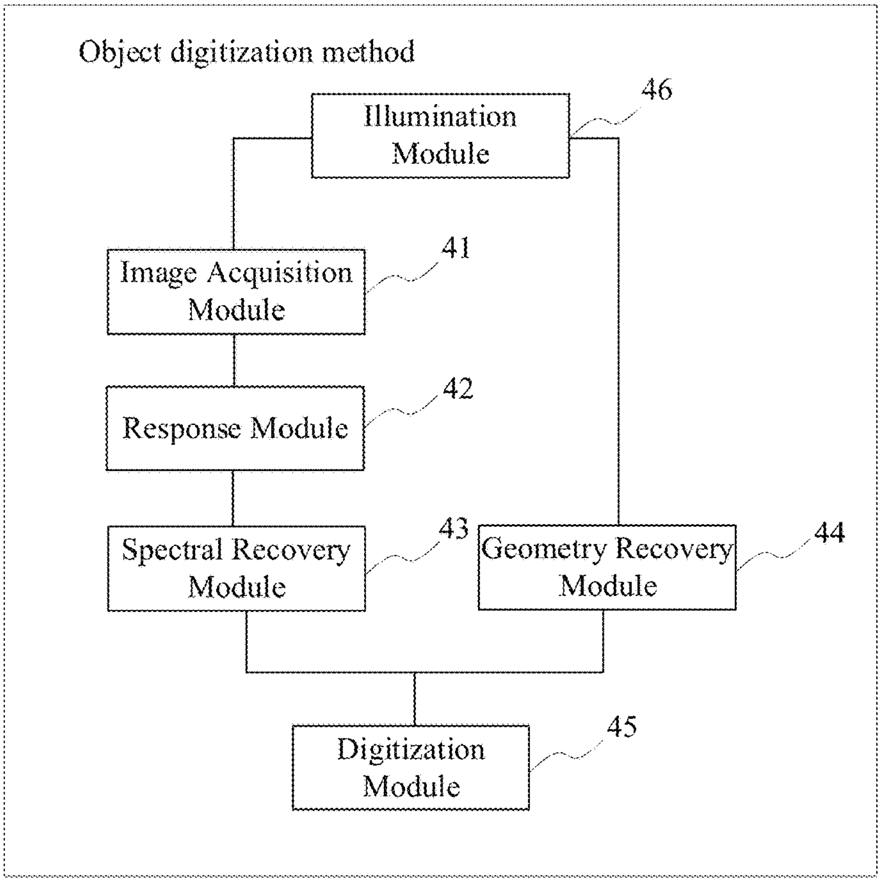
FIG. 10 shows a schematic structural diagram of an object digitization device according to one embodiment of the present disclosure.

As shown in FIG. 10, the present disclosure provides an object digitization device, including:

an image acquisition module 41, configured to acquire spectral images of a target object under multi-node illumination light sources;

a response module 42, configured to obtain a response function of the spectral images;

a spectral recovery module 43, configured to recover reflection spectra of the target object based on the response function and a reflection database;

a geometry recovery module 44, configured to acquire a detailed point cloud of the target object;

a digitization module 45, configured to digitize the target object based on the detailed point cloud and recovered reflection spectra of the target object.

Furthermore, the image acquisition module 41 is further configured to obtain multi-angle images of the target object.

Referring to FIG. 10. The object digitization device of the present disclosure also includes an illumination module 46. The illumination module 46 is configured to control light intensities of the multi-node illumination light sources.

Specifically, the multi-node illumination light sources provided by the illumination module 46 include multiple node light sources, and each of the node light sources is provided with a single-color-channel spectral light source or an N-color-channel spectral light source.

Furthermore, the node light sources, those within a frontal range of the target object are respectively provided with N-color-channel spectral light sources.

Each of the spectral light sources includes an LED light source and, arranged sequentially along a light transmission direction, an LED collimator, a microlens array, a projection lens, and a semi-transparent mirror. A light beam emitted by the LED light source sequentially passes through the LED collimator, the microlens array, the projection lens, and the semi-transparent mirror, and the light beam is then vertically incident on the target object.

Furthermore, the LED light source is a circular light source including LEDs of four color channels, with those of the same color channel arranged symmetrically, respectively.

Furthermore, the multiple node light sources can be distributed in a light cage configuration, a linear configuration, or a planar configuration. When distributed in the linear configuration, it includes both X-direction linear and Y-direction linear arrangements.

When the multiple node light sources are distributed in the light cage configuration or the linear configuration, the light intensity of each node light source is controlled by a light intensity function to adjust the intensity of the node light sources based on different angles (with the target object as a reference).

When the multiple node light sources are distributed in a planar configuration, the light intensity of each node light source is controlled by both the light intensity function and the distance function to adjust the intensity of the node light sources based on different angles and distances (with the target object as a reference). The light intensity function is:

$$L_i = k \cdot \text{theta } (i)$$

where $L_i$ is the light intensity of an i-th node light source, k is a constant, and theta (i) is an angle of the i-th node light source with respect to the target object. The distance function is:

$$L_i = d^2$$

where d is a distance between an i-th node light source and the target object.

Specifically, when it is necessary to digitize a target object, the target object is placed in an illuminated area and illuminated by the multi-node illumination light sources provided by the illumination module 46. Meanwhile, the illumination module 46 controls the N-color-channel (N∈[3,15]) spectral light sources to illuminate channel by channel to obtain N-color-channel multi-node spectral images of the target object. Subsequently, the response function of spectral images is obtained by the response module 42, and the reflection spectra of the target object are recovered by the spectral recovery module 43 based on the response function and a reflection database; meanwhile, the illumination module 46 can control the light intensity of multiple node light sources to provide the gradient lighting required for geometric recovery. Additionally, the image acquisition module 41 will also capture multi-angle images of the target object, so that the geometry recovery module 44, can ultimately obtain the detailed point cloud of the target object. Finally, the digitization module 45 can achieve digitization after obtaining the three-dimensional information and spectral information of the target object.

It should be noted that the structure and principles of the image acquisition module 41, the response module 42, the spectral recovery module 43, the geometry recovery module 44, the digitization module 45, and illumination module 46 can refer to the content of the above-mentioned method embodiments.

The embodiments of the present disclosure also provide a facial scanning device, which includes the object digitization device provided in the above embodiments. For the specific structure and principles of the facial scanning device, please refer to the above content.

The embodiments of the present disclosure also provide a handheld digitization device, said device includes the object digitization device provided in the above embodiments.

The image acquisition module is further configured to acquire spatial positions and orientations of the multi-node illumination light sources relative to the target object.

The illumination module controls the light intensities of the multi-node illumination light sources based on the spatial positions and the orientations of the multi-node illumination light sources relative to the target object.

Specifically, taking a smartphone as an example, the camera of the smartphone serves as an image acquisition module. The illumination module can be installed as a smartphone accessory or can be integrated into the smartphone as a flashlight. Taking digitization of a face using a smartphone as an example, the principle is as follows:

A smartphone is positioned facing the face, and the multi-node illumination light sources provided by the flashlight are used for illumination. At this time, the flashlight controls the N-color-channel spectral light sources to light up sequentially, and the camera captures the spectral images of the face under the N color channels. Then, the spectral recovery module, configured to recover reflection spectra of the target object based on the response function and a reflection database; meanwhile, the smartphone is moved to create a virtual distribution shape of the light sources. The smartphone Inertial Measurement Unit (IMU) and camera can be utilized to determine the position and direction of the smartphone (flashlight) in space, as well as the distance relative to the face. For example, when a smartphone is moved around the face, forming a light cage configuration or linear configuration, the brightness of the flashlight can be controlled based on its position and direction (light intensity function) to provide the gradient lighting required for geometric recovery. For example, when the smartphone is moved around the face, forming a light cage configuration or a linear configuration, brightness of flashlight can be controlled based on its position and direction (light intensity function) to provide a gradient lighting required for geometric recovery. When the smartphone is moved around the face, forming a planar configuration, the brightness of the flashlight can be controlled based on its position, direction, and distance (light intensity function and distance function) to provide the gradient lighting needed for geometric recovery. At the same time, the camera will also capture multi-angle images, allowing for the acquisition of a detailed point cloud of the target object based on the gradient lighting and multi-angle images. Finally, after obtaining the three-dimensional information and spectral information of the target object, digitization can be achieved.

In some embodiments, systems based on drones or robotic arms can also be used to scan along a predetermined path.

It is evident that the object digitization and the facial scanning method, device, and handheld digitization equipment provided in the present disclosure can quickly restore the true reflection spectrum of the target object and the high-resolution three-dimensional shape of the object, creating a realistic digital avatar for applications in digital fields such as the metaverse. Additionally, the present disclosure effectively achieves facial digitization, enabling facial health monitoring and beauty treatments, as well as finding the best cosmetics for spectral matching under any lighting conditions, thereby ensuring the health of the human face. Finally, the present disclosure provides a handheld digitization device that can effectively digitize physical target objects in any scenario, enhancing the convenience and speed of digitization.

In the various embodiments provided in the present, it should be understood that the disclosed systems, devices, or methods can be implemented in other ways. For example, the device embodiments described above are merely illustrative. The division of modules/units is just one logical functional division; in practical implementations, there can be alternative ways of division. For instance, multiple modules or units can be combined or integrated into another system, or some features may be omitted or not executed. Additionally, the couplings or direct couplings or communication connections shown or discussed among the various components can be indirect couplings or communication connections through some interfaces, devices, or modules/units. These connections can be electrical, mechanical, or in other forms.

The modules/units described as separate components may or may not be physically separated. The components displayed as modules/units may or may not be physical modules, meaning they can be located in one place or distributed across multiple network units. Depending on actual needs, some or all of the modules/units can be selected to achieve the objectives of the embodiments of the present disclosure. For example, in various embodiments of this application, each functional module/unit can be integrated into a single processing module, or each module/unit can exist physically separately, or two or more modules/units can be integrated into one module/unit.

A person skilled in this art should also further realize that the units and algorithm steps described in the examples disclosed herein can be implemented using electronic hardware, computer software, or a combination of both. To clearly illustrate the interchangeability of hardware and software, the compositions and steps of each example have been described generally according to their functions in the above description. Whether these functions are executed in hardware or software depends on the specific application of the technical solution and design constraints. Professionals may use different methods to achieve the described functions for each specific application, but such implementations should not be considered beyond the scope of the present disclosure.

The embodiments of the present disclosure also provide a computer-readable storage medium. A person skilled in the art can understand that all or part of the steps in the methods of the above embodiments can be completed by a program instructing a processor, and the program can be stored in a computer-readable storage medium. The storage medium is a non-transitory medium, such as random-access memory, read-only memory, flash memory, hard disk, solid-state drive, magnetic tape, floppy disk, optical disc, and any combination thereof. The above storage medium can be any available medium that a computer can access or data storage devices such as servers or data centers that integrate one or more available media. The available media can be magnetic media (e.g., floppy disks, hard disks, magnetic tapes), optical media (e.g., digital video discs (DVDs)), or semiconductor media (e.g., solid-state disks (SSDs)), etc.

The embodiments of the present disclosure also provide an electronic device. The electronic device includes a processor and a memory.

The memory is used to store computer programs.

The memory includes various media that can store program code, such as ROM, RAM, magnetic disks, USB drives, storage cards, or optical discs.

The processor is connected to the memory and is used to execute the computer programs stored in the memory, enabling the electronic device to perform the above-mentioned object digitization method and/or facial scanning method.

Preferably, the processor can be a general-purpose processor, including a Central Processing Unit (CPU), a Network Processor (NP), etc.; it can also be a Digital Signal Processor (DSP), an Application Specific Integrated Circuit (ASIC), a Field Programmable Gate Array (FPGA), or other programmable logic devices, discrete gates or transistor logic devices, or discrete hardware components.

Figure 11:
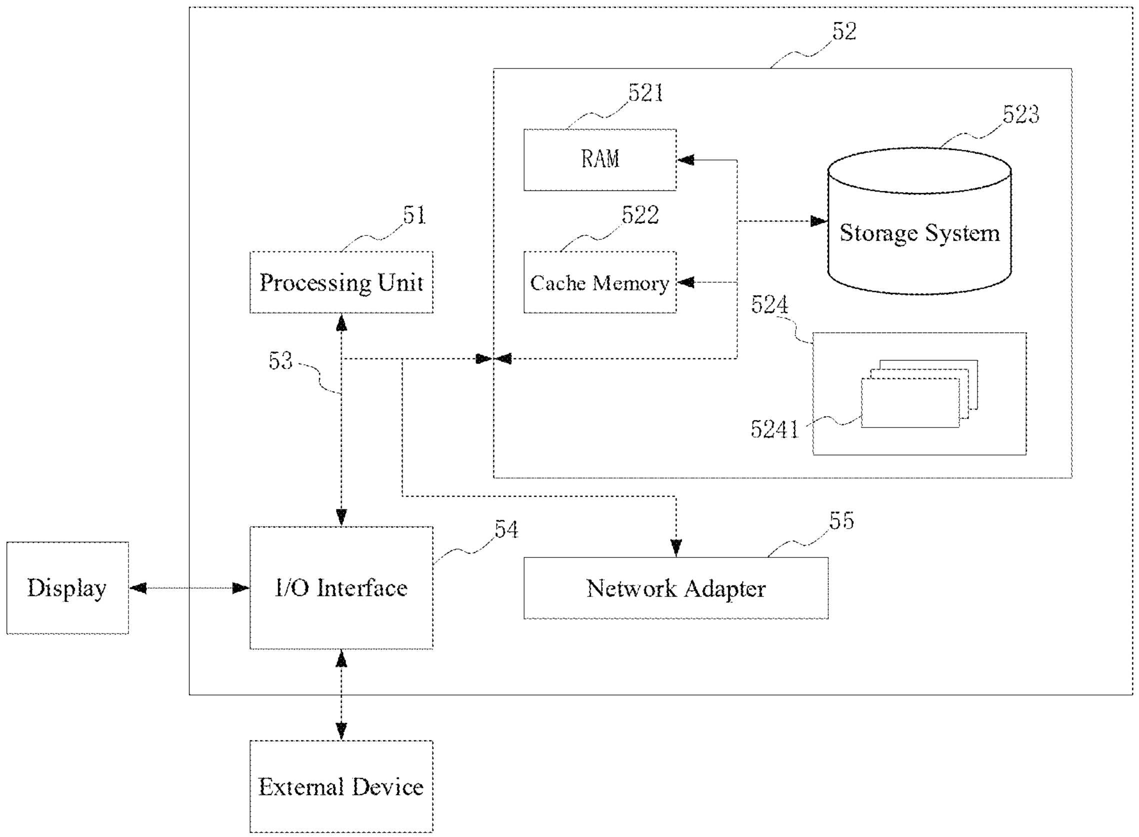
FIG. 11 shows a schematic structural diagram of an electronic device according to one embodiment of the present disclosure.

As shown in FIG. 11, the electronic device of the present disclosure is represented in the form of a general-purpose computing device. The components of the electronic device may include, but are not limited to: one or more processors or processing units 51, a memory 52, and a bus 53 connecting different system components (including the memory 52 and the processing unit 51).

The bus 53 represents one or more types of bus structures, including a memory bus or memory controller, peripheral bus, graphics acceleration port, and local bus using any of various bus structures. For example, these architectures include, but are not limited to, Industry Standard Architecture (ISA) bus, Micro Channel Architecture (MCA) bus, Enhanced ISA bus, Video Electronics Standards Association (VESA) local bus, and Peripheral Component Interconnect (PCI) bus.

The electronic device typically includes various computer system-readable media. These media can be any available medium that can be accessed by the electronic device, including volatile and non-volatile media, removable and non-removable media.

The memory 52 may include computer system-readable media in the form of volatile memory, such as a Random Access Memory (RAM) 521 and/or a cache memory 522. The electronic device may further include other removable/non-removable and volatile/non-volatile computer system storage media. For example, the storage system 523 may be used to read and write non-removable, non-volatile magnetic media (not shown in FIG. 11, commonly referred to as "hard disk drives"). Although not illustrated in FIG. 11, disk drives may be provided for reading and writing removable non-volatile magnetic disks (such as "floppy disks"), as well as optical disc drives for reading and writing removable non-volatile optical discs (such as CD-ROMs, DVD-ROMs, or other optical media). In these cases, each drive may be connected to the bus 53 via one or more data media interfaces. The memory 52 may include at least one program product, which has a set of (e.g., at least one) program modules that are configured to perform the functions of the various embodiments of the present disclosure.

The memory 52 may also include the programs/utilities 524 containing one or more program modules 5241; the program modules 5241 include: an operating system, one or more applications, other program modules, and program data, and each of these examples, or some combination thereof, may incorporate an implementation of a networked environment. The program modules 5241 generally perform the functions and/or methods described in the embodiments of the present disclosure.

The electronic device may also communicate with one or more external devices (e.g., keyboard, pointing device, display, etc.), as well as with one or more devices that enable user interaction with the electronic device, and/or with any device that allows the electronic device to communicate with one or more other computing devices (e.g., network cards, modems, etc.). Such communication can occur through an input/output (I/O) interface 54. And, the electronic device may also communicate with one or more networks (e.g., a local area network (LAN), a wide area network (WAN), and/or a public network, such as the Internet) via a network adapter 55. As shown in FIG. 11, the network adapter 55 communicates with other modules of the electronic device via the bus 53. It should be appreciated that, although not shown in the figures, other hardware and/or software modules may be used in conjunction with the electronic device, such modules comprise microcode, device drivers, redundant processors, external disk drive arrays, redundant arrays of independent disks (RAID) systems, tape drives, and data backup storage systems.

The embodiments of the present disclosure may also provide a computer program product, said product includes one or more computer instructions. When the computer instructions are loaded and executed on a computing device, they generate all or part of the processes or functions according to the embodiments of the present disclosure. The computer instructions can be stored in a computer-readable storage medium, or transferred from one computer-readable storage medium to another, for example, the computer instructions can be transmitted from one website, computer, or data center to another website, computer, or data center via wired (e.g., coaxial cable, fiber optics, Digital Subscriber Line (DSL)) or wireless (e.g., infrared, radio, microwave, etc.) methods.

When the computer program product is executed by a computer, the computer performs the method described in the embodiments of the method. The computer program product can be a software installation package, said package can be downloaded and executed on a computer when there is a need to use the above-mentioned methods.

The descriptions of the processes or structures corresponding to the various figures each emphasize different aspects; any parts not detailed in a particular process or structure can be referenced in the relevant descriptions of other processes or structures.

The above-mentioned embodiments are merely illustrative of the principle and effects of the present application instead of restricting the scope of the present disclosure. Modifications or variations of the above-described embodiments may be made by those skilled in this art without departing from the spirit and scope of the present application. Therefore, all equivalent modifications or changes made by those who have common knowledge in the art without departing from the spirit and technical concept disclosed by the present disclosure shall be still covered by the claims of the present disclosure.

What is claimed is:

1. A method for object digitization, comprising:

obtaining spectral images of a target object under multi-node illumination light sources;

obtaining a response function of the spectral images;

recovering reflection spectra of the target object based on the response function and a reflection database;

obtaining a detailed point cloud of the target object; and digitizing the target object based on the detailed point cloud and the recovered reflection spectra of the target object.

2. The method for object digitization according to claim 1, wherein the multi-node illumination light sources comprise multiple node light sources, and each of the node light sources is provided with a single-color-channel spectral light source or an N-color-channel spectral light source, N∈[3, 15].

3. The method for object digitization according to claim 2, wherein of the node light sources, those within a frontal range of the target object are respectively provided with N-color-channel spectral light sources, N∈[3,15].

4. The method for object digitization according to claim 2, wherein each of the spectral light sources comprises an LED light source and, arranged sequentially along a light transmission direction, an LED collimator, a microlens array, a projection lens, and a semi-transparent mirror; wherein a light beam emitted by the LED light source sequentially passes through the LED collimator, the microlens array, the projection lens, and the semi-transparent mirror, and the light beam is then vertically incident on the target object.

5. The method for object digitization according to claim 4, wherein the LED light source is a circular light source comprising LEDs of four color channels, with those of the same color channel arranged symmetrically, respectively.

6. The method for object digitization according to claim 3, wherein obtaining the spectral images of the target object under the multi-node illumination light sources comprises:

controlling the N-color-channel spectral light sources to illuminate channel by channel to obtain N-color-channel multi-node spectral images of the target object.

7. The method for object digitization according to claim 6, wherein the response function of the spectral image is:

$$RE\ [N \times 1] = ALED\ [N \times S * RefSpec\ [S \times 1]$$

wherein RE[Nx1] represents each pixel in the N-color-channel spectral images, ALED[NxS] represents emission spectra of the N-color-channel spectral light sources, N∈[3,15], RefSpec[Sx1] represents the reflection spectra of the target object, and S represents wavelengths corresponding to the N color channels, S∈[350,800].

8. The method for object digitization according to claim 7, wherein the reflection database is obtained by:

obtaining a plurality of sample objects, which have a same type as the target object;

obtaining a plurality of sample reflection spectra of the plurality of sample objects based on the N-color-channel spectral light sources;

obtaining a plurality of spectral clusters based on spectral similarity of the plurality of sample reflection spectra;

obtaining M representative reflection spectra based on the plurality of spectral clusters; and using multiplication results of the M representative reflection spectra and the emission spectra of the N-color-channel spectral light sources as the reflection data of the reflection database.

9. The method for object digitization according to claim 8, wherein recovering the reflection spectra of the target object based on the response function and the reflection database comprises;

comparing each pixel in the N-color-channel spectral images with the reflection data to generate a weight matrix;

recovering the reflection spectra of the target object based on the weight matrix.

10. The method for object digitization according to claim 9, wherein the weight matrix is obtained based on weighted least squares, and is given by:

$$W_i = \frac{R_i \cdot RE[N \times 1]}{|R_i| \cdot |RE[N \times 1]|}$$

wherein Ri represents a multiplication result of an i-th representative reflection spectrum and the emission spectra of the N-color-channel spectral light sources, $i \in [1,M]$.

11. The method for object digitization according to claim 10, wherein the recovered reflection spectra of the target object is given by:

$$Spectest = \sum a_{test-p} \cdot RefSpec[S \times 1]$$

wherein $a_{test-p}$ is a p-th principal component of the target object and $$a_{test-p} = T \cdot RE[Nx1],$$

$$T = X[p \times M] \cdot W_i[M \times M] \cdot R^T[M \times N] \cdot inv\left[R_{N \times M} W_{iM \times M} R^T_{M \times N}\right] = [p \times N].$$

12. The method for object digitization according to claim 2, wherein obtaining the detailed point cloud of the target object comprises:

obtaining a rough point cloud of the target object;

obtaining surface normals of the target object based on the multi-node illumination light sources; and obtaining the detailed point cloud based on the rough point cloud and the surface normal.

13. The method for object digitization according to claim 12, wherein obtaining the rough point cloud of the target object comprises:

obtaining multi-angle images of the target object;

calculating a fundamental matrix based on feature matching among the multi-angle images;

calculating a camera matrix based on the fundamental matrix; and obtaining the rough point cloud of the target object based on the camera matrix.

14. The method for object digitization according to claim 12, wherein obtaining the surface normals of the target object based on the multi-node illumination light sources comprises:

obtaining a first luminance value and a second luminance value of the target object;

obtaining the surface normals based on a comparison result of the first luminance value with the second luminance value.

15. The method for object digitization according to claim 14, wherein the first luminance value is a brightness value of the target object illuminated by a first plurality of node light sources with a same light intensity.

16. The method for object digitization according to claim 14, wherein the second luminance value is a brightness value of the target object illuminated by a second plurality of node light sources with different light intensities; wherein the light intensities of the node light sources are controlled by a light intensity function.

17. The method for object digitization according to claim 16, wherein the second plurality of the node light sources are arranged in a light cage configuration.

18. The method for object digitization according to claim 16, wherein the second plurality of the node light sources are linearly distributed along an X direction or a Y direction.

19. The method for object digitization according to claim 14, wherein the second luminance value is obtained as a brightness value of the target object illuminated by a third plurality of node light sources with different light intensities; wherein the light intensities of the third plurality of node light sources are controlled by a light intensity function and a distance function.

20. The method for object digitization according to claim 19, wherein the third plurality of node light sources are arranged in a planar configuration.

21. The method for object digitization according to claim 16, wherein the light intensity function is:

$$L_i = k \cdot \text{theta } (i)$$

wherein $L_i$ is the light intensity of an i-th node light source, k is a constant, and theta (i) is an angle of the i-th node light source with respect to the target object.

22. The method for object digitization according to claim 19, wherein the distance function is:

$$L_i = d^2$$

wherein d is a distance between an i-th node light source and the target object.

23. The method for object digitization according to claim 12, wherein obtaining the detailed point cloud based on the rough point cloud and the surface normals comprises:

obtaining normals of the rough point cloud;

correcting the rough point cloud based on the normals of the rough point cloud and the surface normals of the target object to obtain a corrected point cloud; and performing a correction operation iteratively until a comparison between the surface normals of the target object and the normals of the corrected point cloud satisfies a preset condition; wherein the correction operation comprises correcting the corrected point cloud based on the surface normals of the target object and the normals of the corrected point cloud to obtain a new corrected point cloud.

24. The method for object digitization according to claim 12, wherein obtaining the detailed point cloud based on the rough point cloud and the surface normals comprises:

obtaining normals of the rough point cloud; and optimizing the normals based on a bi Laplace equation; wherein the surface normals are used as Neumann boundary conditions.

25. An object digitization device, wherein the device comprises:

an image acquisition module, configured to acquire spectral images of a target object under multi-node illumination light sources;

a response module, configured to obtain a response function of the spectral images;

a spectral recovery module, configured to recover reflection spectra of the target object based on the response function and a reflection database;

a geometry recovery module, configured to acquire a detailed point cloud of the target object; and a digitization module, configured to digitize the target object based on the detailed point cloud and recovered reflection spectra of the target object.

26. The object digitization device according to claim 25, wherein the device comprises an illumination module, wherein the illumination module is configured to provide the multi-node illumination light sources; and the illumination module is configured to control light intensities of the multi-node illumination light sources.

27. The object digitization device according to claim 25, wherein the image acquisition module is further configured to acquire multi-angle images of the target object.

28. A facial scanning method, wherein the method performs a digital scanning of a face using the method for object digitization according to claim 1, to obtain reflection spectra and a three-dimensional shape of the face; and evaluates facial cosmetic effects based on at least one of indicators derived from the reflection spectra of the face, wherein the indicators comprise: melanin concentration index, epidermal surface thickness index, blood volume index, and oxygen content index.

29. The facial scanning method according to claim 28, wherein the method further comprises: evaluating facial health based on the reflection spectra and the three-dimensional shape of the face.

30. The facial scanning method according to claim 28, wherein the method further comprises: evaluating a matching effect between the face and a cosmetic product based on the reflection spectra of the face and reflection spectra of the cosmetic product.

31. A facial scanning device, wherein the device comprises the object digitization device according to claim 25.

32. A handheld digitization device, wherein the device comprises the object digitization device according to claim 25; wherein the image acquisition module is further configured to acquire spatial positions and orientations of the multi-node illumination light sources relative to the target object.

33. The handheld digitization device according to claim 32, wherein the illumination module controls the light intensities of the multi-node illumination light sources based on the spatial positions and the orientations of the multi-node illumination light sources relative to the target object.

* * * * *